(12) United States Patent
Cheng

(10) Patent No.: US 10,363,511 B2
(45) Date of Patent: Jul. 30, 2019

(54) DUST COLLECTOR PROVIDED WITH A SHUNT GUIDE PLATE

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 251 days.

(21) Appl. No.: 15/606,458

(22) Filed: May 26, 2017

(65) Prior Publication Data
US 2018/0339257 A1 Nov. 29, 2018

(51) Int. Cl.
*B01D 46/24* (2006.01)
*B01D 50/00* (2006.01)
*B01D 45/12* (2006.01)
*B01D 46/00* (2006.01)
*B01D 46/48* (2006.01)

(52) U.S. Cl.
CPC ......... *B01D 46/24* (2013.01); *B01D 46/0045* (2013.01); *B01D 46/0065* (2013.01); *B01D 46/48* (2013.01); *B01D 50/002* (2013.01); *B01D 45/12* (2013.01); *B01D 46/2403* (2013.01)

(58) Field of Classification Search
CPC ...... B01D 50/002; B01D 45/02; B01D 45/12; B01D 45/16; B01D 46/48; B01D 46/0045; B01D 46/0065; B01D 46/24; B01D 46/2403; B01D 46/2411
See application file for complete search history.

(56) References Cited

U.S. PATENT DOCUMENTS

| | | | | |
|---|---|---|---|---|
| 3,541,764 A * | 11/1970 | Astrom | ............ | B01D 46/0068 55/302 |
| 5,066,315 A * | 11/1991 | Haberl | ............... | B01D 50/002 55/302 |
| 5,746,795 A * | 5/1998 | Witter | .................. | B01D 45/16 55/337 |
| 7,282,074 B1 * | 10/2007 | Witter | .................. | B01D 45/12 451/453 |
| 7,955,404 B2 * | 6/2011 | Lin | ..................... | B01D 45/12 55/305 |
| 8,161,597 B2 * | 4/2012 | Witter | .................. | A47L 5/365 15/320 |
| 9,399,184 B2 * | 7/2016 | Witter | .................. | A47L 9/1608 |
| 2008/0016830 A1 * | 1/2008 | Witter | .................. | B01D 45/12 55/337 |

(Continued)

*Primary Examiner* — Robert Clemente
(74) *Attorney, Agent, or Firm* — Sinorica, LLC

(57) ABSTRACT

A dust collector provided with a shunt guide plate includes a main body, a filter drum, a dust collecting barrel and an induced draft device. A cover plate is fixed between the main body and the dust collecting barrel, having a central portion bored with an insert hole corresponding to the main body, and a guide plate is transversely disposed under the cover plate. Thus, the induced draft device is started to absorb airflow with dust into the main body and, when passing through the insert hole of the cover plate, the airflow will be stopped by the guide plate and forced to flow through two sides of the guide plate to form a shunt effect. Thus, when airflow gets into the dust collecting barrel, the dust in the dust collecting barrel will not be affected to rise, enhancing dust collecting effect of the dust collecting barrel.

6 Claims, 9 Drawing Sheets

(56) References Cited

U.S. PATENT DOCUMENTS

| | | | |
|---|---|---|---|
| 2010/0218467 A1* | 9/2010 | Witter | B01D 45/12 55/337 |
| 2010/0257826 A1* | 10/2010 | Lin | B01D 45/14 55/337 |
| 2011/0126716 A1* | 6/2011 | Cheng | B01D 46/0075 96/421 |
| 2011/0203236 A1* | 8/2011 | Witter | B01D 46/0093 55/336 |

* cited by examiner

DUST COLLECTOR PROVIDED WITH A SHUNT GUIDE PLATE

BACKGROUND OF THE INVENTION

1. Field of the Invention

This invention relates to a dust collector, particularly to one provided therein with a shunt guide plate having a shunt effect.

2. Description of the Prior Art

A workplace, which is easy to produce chips or dust, such as a wood working factory, is usually installed with a dust collector for collecting chips and dust. A conventional dust collector includes a dust collecting box formed with an air intake, an upper air outlet and a lower air outlet. The air intake is connected with an induced draft device, the upper air outlet connected with an air permeable filter drum and the lower air outlet is connected with a dust collecting barrel, the air intake, the upper air outlet and the lower air outlet communicating with one another. Thus, air mixed with chips and dust can be absorbed into the dust collecting box through the air intake by the induced draft device to form an airflow and, affected by gravity, the dust of lighter weight will be actuated by the airflow and brought into the filter drum through the upper air outlet, while the dust of heavier weight will be influenced by force of gravity to fall into the dust collecting barrel via the lower air outlet, thus enabling the dust collector to carry out dust separation operation.

However, when the conventional dust collector is operated, the work table will sway excessively, and the interior of the dust collecting barrel is easy to produce a counter flow phenomenon, rendering the dust and the chips that get into the dust collecting barrel impossible to directly fall down and even likely making the dust and the chips in the dust collecting barrel brought back to the dust collecting box by upward airflow, thus letting chips accumulated on the inner surface of the air permeable filter drum. As a result, effect of separating chips from dust is poor and the conventional dust collector is necessary to be cleaned up frequently to lower working efficiency. Therefore, the inventor of this invention observes the above-mentioned drawbacks and thinks that the conventional dust collector is necessary to be ameliorated and hence devises this invention.

SUMMARY OF THE INVENTION

The objective of this invention is to offer a dust collector provided with a shunt guide plate, able to produce turbulent action in the interior of the dust collector to separate chips from dust in the dust collector for increasing dust collecting effect of the dust collector.

The dust collector provided with a shunt guide plate in the present invention includes a main body having an upper side provided with an induced draft device. The main body communicates with an air intake, a first air outlet and a second air outlet. The first air outlet is connected with a filter drum, while the second air outlet is connected with a cover plate, which is bored with an insert hole corresponding to the second air outlet and has an underside connected with a dust collecting barrel, and characterized by a guide plate, which is provided under the cover plate and stretched across the insert hole of the cover plate.

The dust collector provided with a shunt guide plate in the present invention is to start the induced draft device to have airflow with dust absorbed into the interior of the main body. When the airflow passes through the insert hole of the cover plate, the airflow will be stopped by the guide plate and forced to pass through two sides of the guide plate to form a shunt effect.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
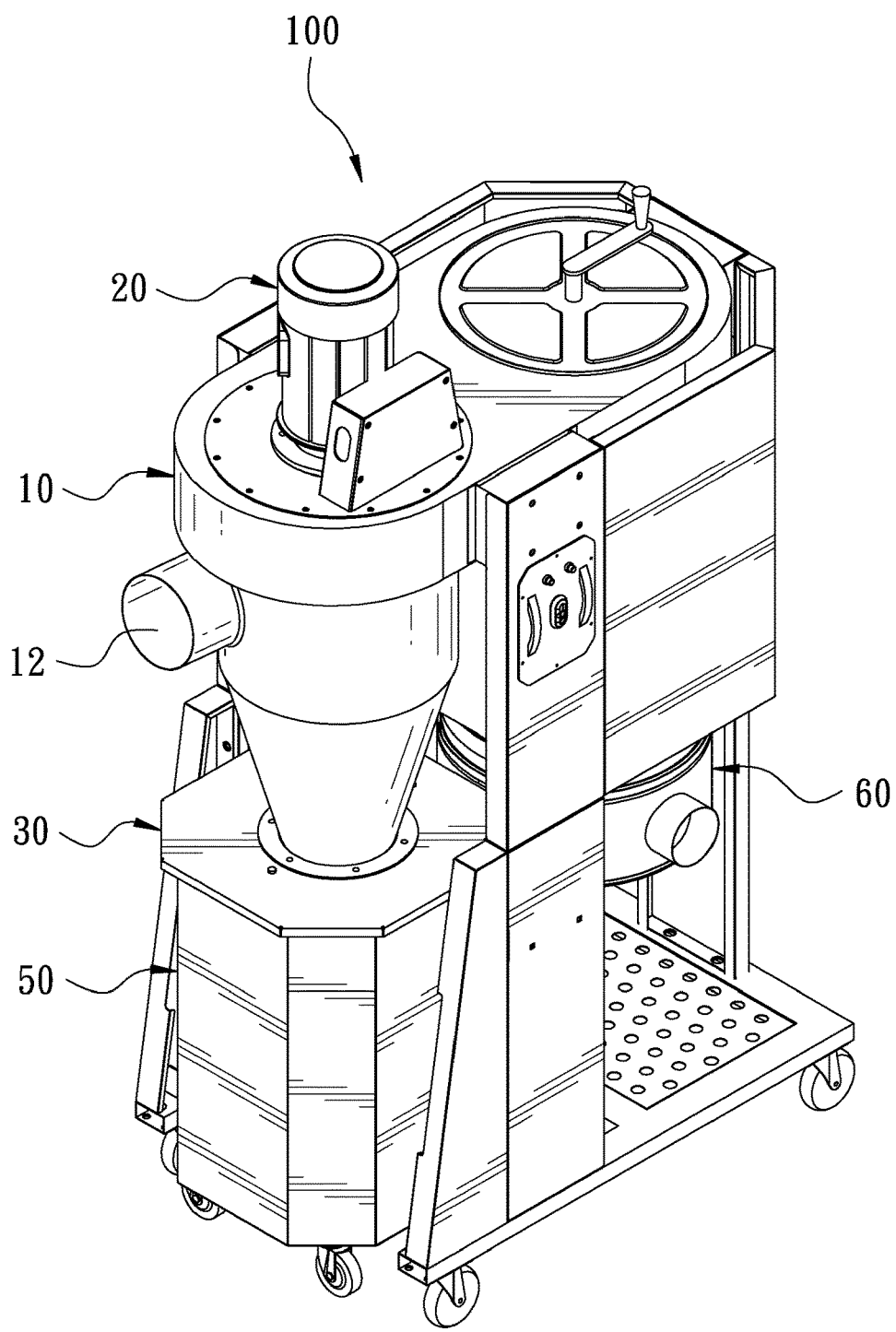
FIG. 1 is a perspective view of a first preferred embodiment of a dust collector provided with a shunt guide plate in the present invention.
Figure 2:
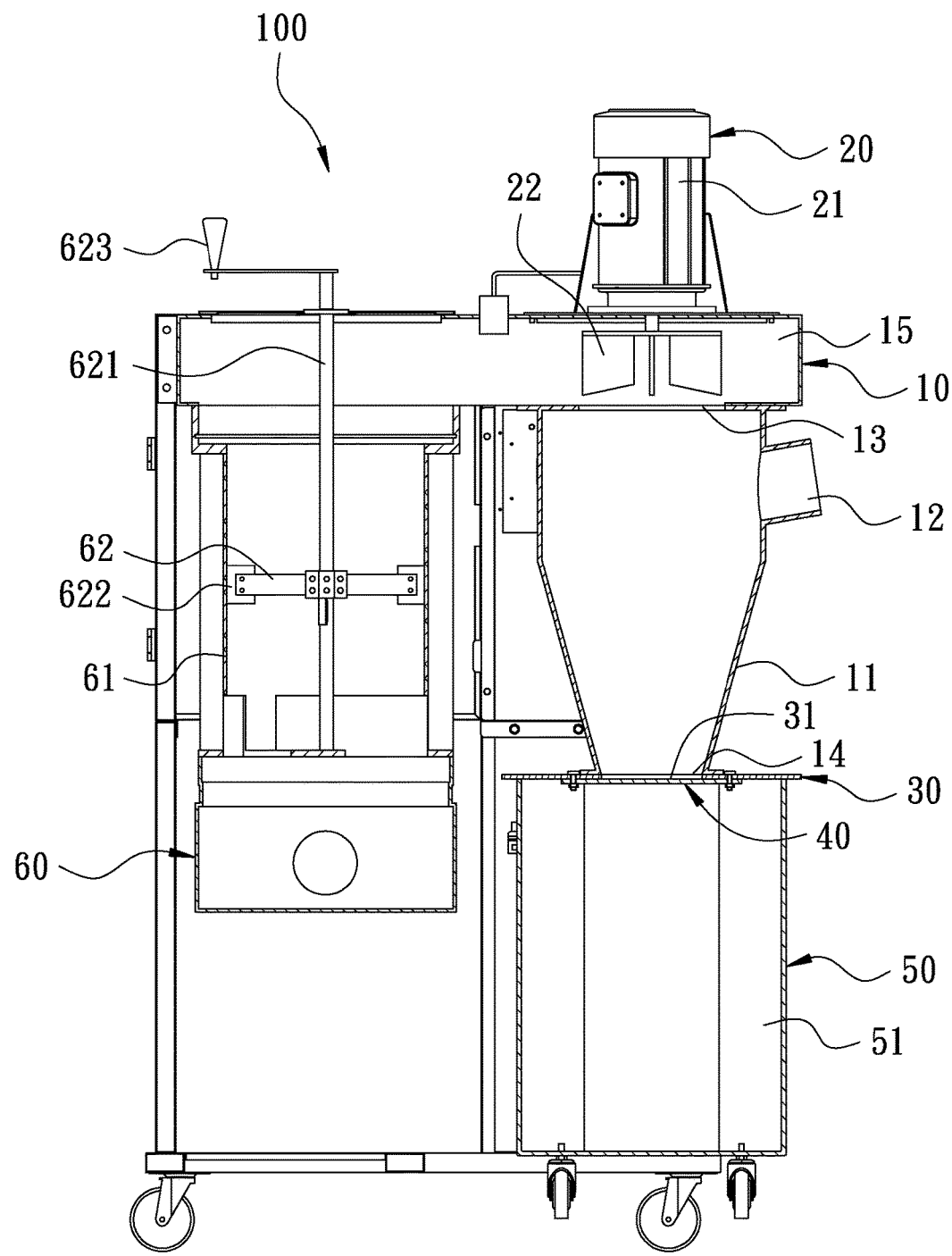
FIG. 2 is a front cross-sectional view of the first preferred embodiment of the dust collector provided with a shunt guide plate in the present invention.
Figure 3:
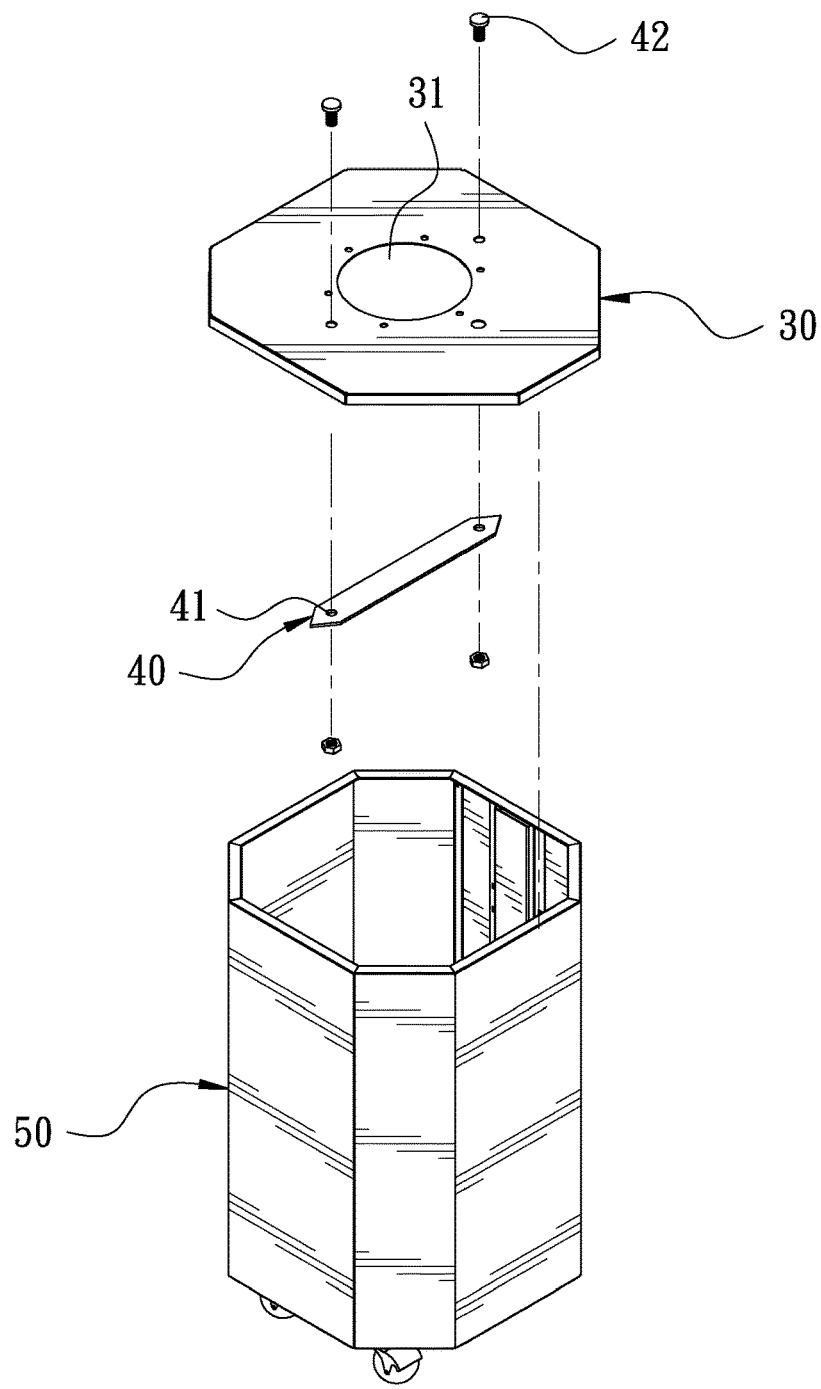
FIG. 3 is a partial exploded perspective view of the first preferred embodiment of the dust collector provided with a shunt guide plate in the present invention.
Figure 4:
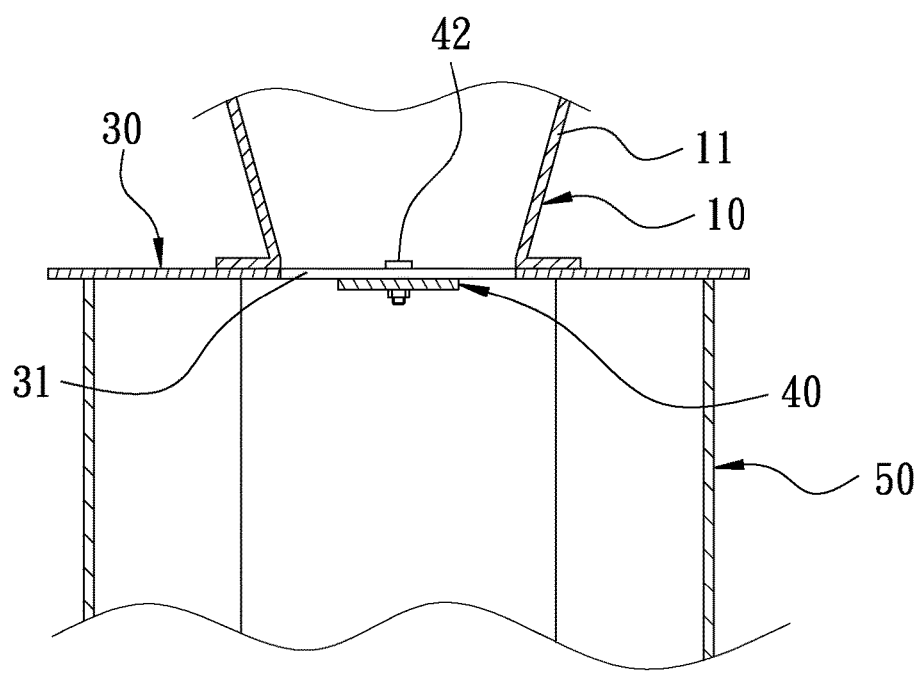
FIG. 4 is partial cross-sectional view of the first preferred embodiment of one side of a main body and a dust collecting barrel in the present invention.

A first preferred embodiment of a dust collector provided with a shunt guide plate in the present invention, as shown in FIGS. 1-4, includes a main body 10, an induced draft device 20, a cover plate 30, a guide plate 40, a dust collecting barrel 50 and a filter drum 60 as main components combined together.

The main body 10 is provided with an air guide barrel 11 connected with an air intake 12, a first air outlet 13 and a second air outlet 14. The air intake 12 is provided at an outer circumference of the air guide barrel 11 and the first air outlet 13 is positioned at an upper side of the air guide barrel 11, while the second air outlet is at a lower side of the air guide barrel 11. Further, the first air outlet 13 is connected with an air duct 15.

The induced draft device 20 is positioned at an upper side of the air duct 15 and provided with a motor 21 connected with a fan blade 22, which is located in the interior of the air duct 15 and over the first air outlet 13. The motor 21 is started to actuate the fan blade 22 to rotate for forming airflow in the interior of the main body 10.

The cover plate 30 is disposed at the lower side of the second air outlet 14 and bored with an insert hole 31 corresponding to the second air outlet 14.

The guide plate 40 is fixed under the cover plate 30 and transversely stretched across the insert hole 31 of the cover plate 30. The guide plate 40 is a strip-shaped plate, having two ends respectively provided with a connecting position 41 to be fixed on the cover plate 30 by a bolt 42.

The dust collecting barrel 50 is provided under the cover plate 30, connected with the air guide barrel 11 via the insert hole 31 of the cover plate 30 and formed in the interior with an accommodating space 51 for collecting dust therein.

The filter drum 60 is connected with the air dust 15 and provided with an air permeable filter screen 61 with a plurality of pores that are smaller than dust so that dust can be absorbed and attached to the inner wall of the filter drum 60. Further, the filter drum 60 is provided in the center with a cleaning apparatus 62, which contains a guide rod 621 provided thereon with a scraping brush 622 and a grip 623. The cleaning apparatus 62 is for a user to turn around the grip 623 to actuate the scraping brush 622 to rotate in the interior of the filter drum 60, letting the chips and the dust that adhere to the filter drum 60 shake and fall down for cleaning up the filter drum 60.

Figure 5:
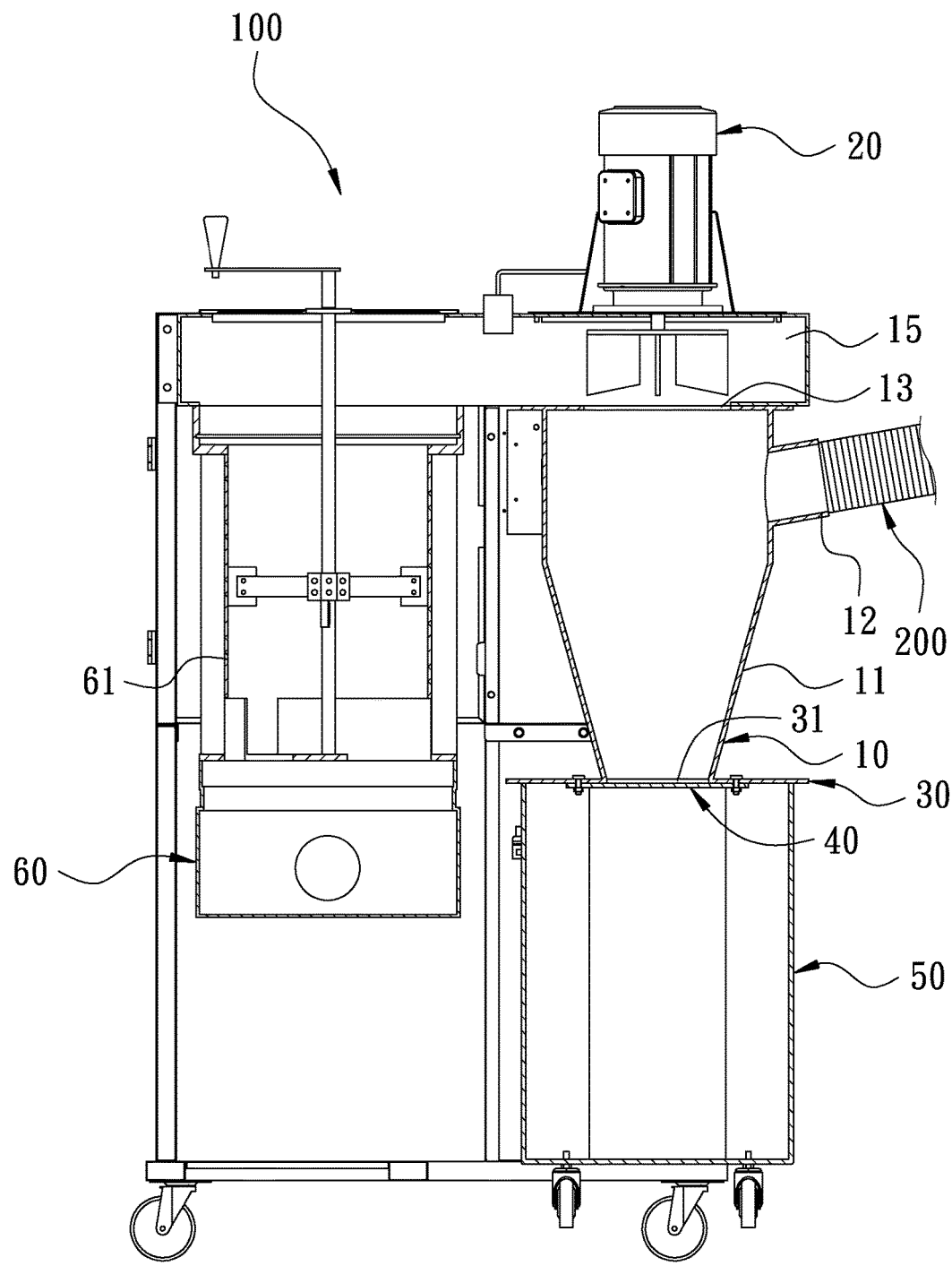
FIG. 5 is a schematic view of the first preferred embodiment of the dust collector provided with a shunt guide plate in use in the present invention.
Figure 6:
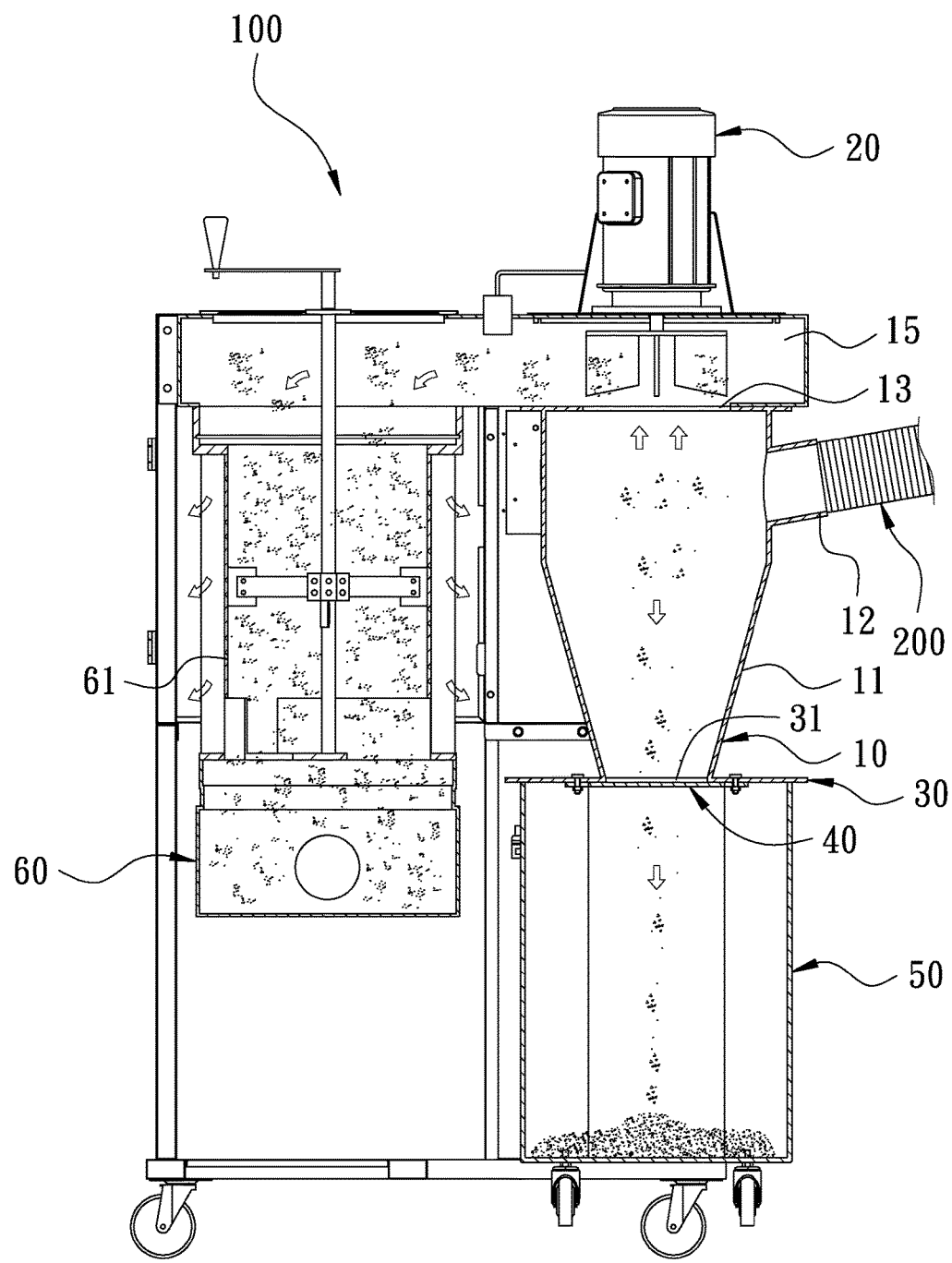
FIG. 6 is a schematic view of the first preferred embodiment of the dust collector in an operating state in the present invention.

Referring to FIGS. 5 and 6, the air intake 12 of the main body 10 is connected with a dust collecting pipe 200. Air with dust can be absorbed into the main body 10 via the induced draft device 20 to form airflow in the interior of the dust collector 100 for carrying out dust separation operation. Thus, when the airflow with dust is in the air guide barrel 11, the dust of lighter weight will be actuated by the airflow to get into the filter drum 60 from the first air outlet 13 and through the air duct 15 and meanwhile, the air permeable filter screen 61 of the filter drum 60 enables the airflow to be guided outward. And the dust of heavier weight will fall into the dust collecting barrel 50 due to gravity. When airflow passes through the insert hole 31 of the cover plate 30, the airflow will be stopped by the guide plate 40 and forced to pass through two sides of the guide plate 40 to form a shunt effect so that, when the airflow gets into the dust collecting barrel 50, the dust in the dust collecting barrel 50 will not be affected by the airflow and scattered upward, thus able to enhance dust separation effect and prolong service life of the dust collector 100 and further unnecessary to clean up the dust collector 100 frequently for elevating working efficiency.

Figure 7:
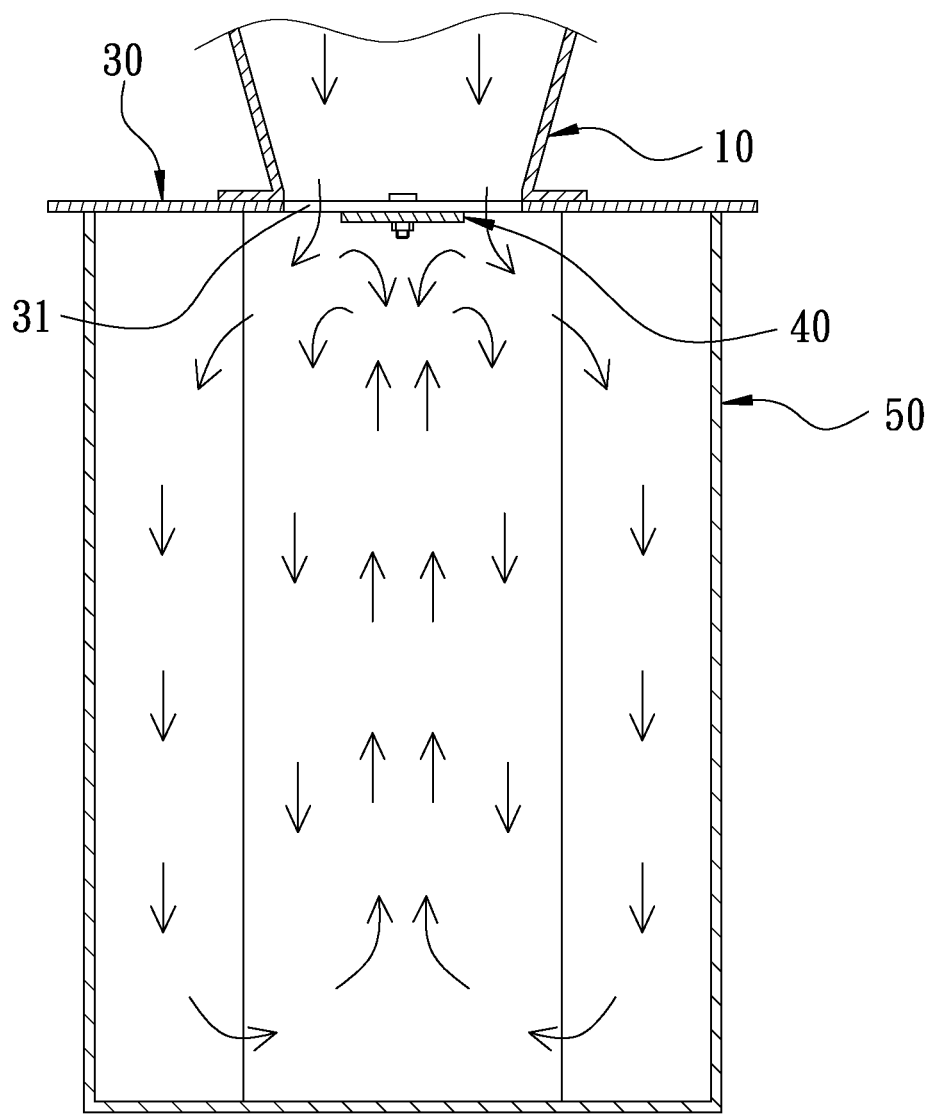
FIG. 7 is a schematic view of the first preferred embodiment of the dust collector in an operating state in the present invention, showing actuation of airflow with dust at another side of the dust collector.

Referring to FIG. 7, when the airflow with dust gets into the dust collecting barrel 50 through the insert hole 31 of the cover plate 30 from the main body 10, the airflow with dust will be stopped by the guide plate 40 and forced to pass through two sides of the guide plate 40 and get into the dust collecting barrel 50 and, when reaching the bottom of the dust collecting barrel 50, the airflow with dust will form a counter flow situation to make the dust raised upward. Simultaneously, the raised airflow will be stopped by the guide plate 40 and can no longer be brought into the main body 10, thus enhancing dust collecting effect of the dust collector.

Figure 8:
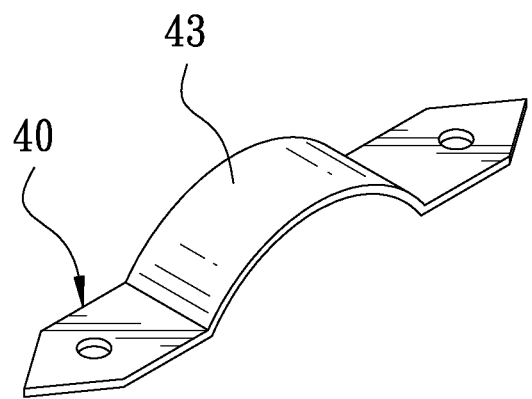
FIG. 8 is a perspective view of a second preferred embodiment of a guide plate of the dust collector in the present invention.

A second preferred embodiment of a guide plate 40 of the dust collector in the present invention, as shown in FIG. 8, is to have a central location of the guide plate 40 formed into an arc-shaped convex arc portion 43 to enable airflow to smoothly flow toward the insert hole 31 of the cover plate 30 and get into the dust collecting barrel 50 when the airflow flows to the guide plate 40.

Figure 9:
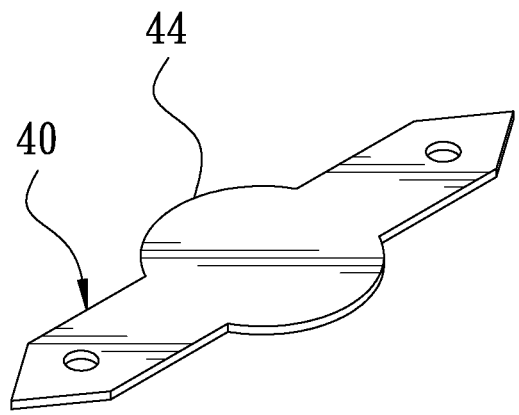
FIG. 9 is a perspective view of a third preferred embodiment of a guide plate of the dust collector in the present invention.

A third preferred embodiment of a guide plate 40 of the dust collector in the present invention, as shown in FIG. 9, is to have two sides of a central portion of the guide plate 40 respectively expanded and formed into an arc-shaped protruding edge 44 for increasing an area of stopping dust and airflow when the airflow with dust flows to the guide plate 40.

Figure 10:
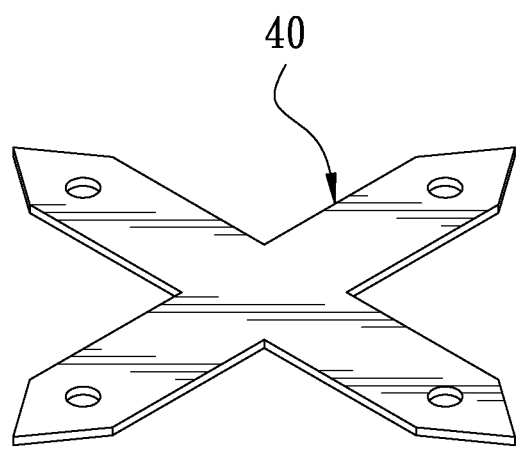
FIG. 10 is a perspective view of a fourth preferred embodiment of a guide plate of the dust collector in the present invention.

A fourth preferred embodiment of a guide plate 40 of the dust collector in the present invention, as shown in FIG. 10, is to have the guide plate 40 formed into a X shape for increasing an area of stopping dust and airflow when the airflow with dust flows to the guide plate 40.

While the preferred embodiments of the invention have been described above, it will be recognized and understood that various modifications may be made therein and the appended claims are intended to cover all such modifications that may fall within the spirit and scope of the invention.

What is claimed is:

1. A dust collector provided with a shunt guide plate comprising a main body, said main body having an upper side provided with an induced draft device, said main body communicating with an air intake, a first air outlet and a second air outlet, said first air outlet connected with a filter drum, said second air outlet connected with a cover plate, said cover plate bored with an insert hole corresponding to said second air outlet, said cover plate having an underside connected with a dust collecting barrel, and characterized by a guide plate provided under said cover plate, said guide plate stretched across said insert hole of said cover plate;

Thus, said induced draft device started to have airflow with dust absorbed into said main body, airflow stopped by said guide plate when the airflow passes through said insert hole of said cover plate, the airflow forced to pass through two sides of said guide plate to form a shunt effect.

2. The dust collector provided with a shunt guide plate as claimed in claim 1, wherein said guide plate is a strip-shaped plate.

3. The dust collector provided with a shunt guide plate as claimed in claim 1, wherein said guide plate has two ends respectively provided with a connecting portion, said connecting portions respectively fixedly combined with said cover plate by a bolt.

4. The dust collector provided with a shunt guide plate as claimed in claim 1, wherein said guide plate has a central location formed into a convex arc portion.

5. The dust collector provided with a shunt guide plates as claimed in claim 1, wherein said guide plate has two sides of a central portion respectively formed into a protruding block.

6. The dust collector provided with a shunt guide plate as claimed in claim 1, wherein said guide plate is X-shaped.

* * * * *